United States Patent Office 3,732,106

Patented May 8, 1973

3,732,106

LIGHT-SENSITIVE COPYING COMPOSITIONS

Hartmut Steppan, Wiesbaden-Dotzheim, Herbert Maar, Wiesbaden, and Kurt-Walter Klupfel, Wiesbaden-Sonnenberg, Germany, assignors to Kalle Aktiengesellschaft, Wiesbaden-Biebrich, Germany No Drawing. Filed Oct. 27, 1971, Ser. No. 193,140
Claims priority, application Germany, Oct. 30, 1970, P 20 53 364.6
Int. Cl. G03c *1/70*
U.S. Cl. 96—115 R 9 Claims

ABSTRACT OF THE DISCLOSURE

This invention relates to a light-sensitive copying composition which comprises at least one light-sensitive unsaturated polymeric substance which is soluble, or at least swellable, in aqueous alkali, and at least one photoinitiator, the polymeric substance being a reaction product of a polymeric substance containing units with active hydrogen atoms, with at least one sulfonyl-isocyanate of the general formula $$R—SO_2—NCO$$

wherein R is selected from the group consisting of an aliphatic or cycloaliphatic group with at least one olefinic double bond.

This invention is concerned with improvements in and relating to light-sensitive copying compositions.

It is known to use, in copying and reproduction technology, light-sensitive copying compositions or materials which change their solubility as a result of the action of light.

As such light-sensitive substances it is possible to use, inter alia, photopolymerizable monomers in combination with high molecular weight binders or photo-cross-linkable polymers.

Copying materials of the first type are described, for example, in U.S. Pat. No. 2,760,863. The light-sensitive layers described therein contain polymeric binders, liquid monomers, for example acrylic or methacrylic acid esters of polyhydric aliphatic alcohols, photoinitiators and, optionally, further additives.

Polymers with a plurality of unsaturated groups, for example unsaturated polyesters based on maleic acid or fumaric acid, and polymers with lateral acrylic acid or methacrylic acid radicals have been used as additives for such photopolymer layers or as the sole unsaturated constituent of the layer, examples being polyvinyl benzoate-acrylate-hydrogen succinate and polyvinyl p-chlorobenzoate-hydrogen fumarate, cellulose acetate-methacrylate-hydrogen succinate and acryloxymethylpolyamides.

The unsaturated polyesters based on maleic acid and fumaric acid can in general be polymerized only very slowly even in the presence of photoinitiators and hence are not preferred in practice.

The polymers which contain radicals of acrylic acid or methacrylic acid as side chains are very easily amenable to photopolymerization, that is to say very light-sensitive, but in the case of these substances undesired preliminary cross-linking occurs very easily even during their manufacture, and this greatly handicaps the manipulation and use of the products. It is therefore also difficult to manufacture storage-stable presensitized copying materials using these polymers as light-sensitive substances.

It is generally advantageous if the development of the photopolymer layers which have been exposed image-wise, for the purpose of manufacture of printing plates, can be carried out with predominantly aqueous, alkaline solutions, on the one hand because of the lesser hazards to health as compared to organic solvents and on the other hand because aqueous alkali exerts a particularly good cleansing action on aluminum which is frequently used as the carrier material, this action being particularly important in the case of the manufacture of planographic printing plates.

A fraction of the above-mentioned unsaturated polymers belongs to this group which is advantageous with regard to ease of development.

However, as a result of this further requirement, the choice of polymers which fulfill all the conditions mentioned for the manufacture of a usable copying material is substantially narrowed.

The present invention provides a light-sensitive copying composition which contains, as essential constituents, at least one light-sensitive unsaturated polymeric substance which is soluble, or at least swellable, in aqueous alkali and at least one photoinitiator, the polymeric substance being a reaction product of a polymeric substance containing units with active hydrogen atoms, with at least one sulfonyl-isocyanate of the general formula $$R—SO_2—NCO$$

wherein R is an aliphatic or cycloaliphatic group with at least one olefinic double bond.

Such light-sensitive copying compositions display good light-sensitivity, good storage stability and good ease of development, especially with aqueous-alkaline developers, and the constituents thereof are available easily and with good reproducibility.

The group R in general contains 2 to about 8 carbon atoms and one or two olefinic double bonds. Examples are vinyl, propenyl, allyl, 1-butenyl-(4), 4-chloro-butadienyl, cyclohexenyl-(1), 3,5-dimethylcyclohexenyl-(1) and 3-vinyl-hexyl groups. Vinyl groups are preferred.

The unsaturated reaction products used according to the invention contain, bonded to the key atoms which in the initial polymer carried the active hydrogen, the polymerizable or cross-linkable group $$—CO—NH—SO_2—R$$

in which the hydrogen atom located on the nitrogen is so greatly activated by the carbonyl and sulfonyl group that it can be split-off as a proton by means of aqueous alkalies, and hence the material can be developed with aqueous-alkaline developers.

The effect of the unsaturated radical R is that the polymers are cross-linked in the presence of suitable initiators or sensitizers under the influence of light, especially light of the near UV range.

The copying composition according to the invention can be used commercially in the form of a solution or dispersion, for example as a so-called photoresist composition, which is applied by the user himself on an individual carrier, for example for chemical milling, for the manufacture of printed circuits and the like, and which is exposed and developed after drying. The composition also can be marketed in the form of a solid layer, present on a support, as a light-sensitive copying material for the manufacture of printing plates, for example for planographic printing, relief printing and intaglio printing.

As regards sensitivity to light when using the light sources customary in reproduction technology, the copying compositions according to the invention lie between the unsaturated polyesters based on maleic acid and fumaric acid and the polymers with lateral acrylic ester or methacrylic ester groups, and have the advantage over the latter that they have substantially less tendency to undesired preliminary cross-linking during manufacture and during storage. The copying layers obtained with the light-sensitive copying composition according to the invention are less sensitive to oxygen.

However, if the light-sensitive copying materials are coated with an oxygen-impermeable covering layer, for example a polyvinyl alcohol film, layers are obtained after exposure and development with aqueous alkali which are cured to a greater extent by the same amounts of light and which, as a result of their lesser abrasion during the printing process, give a longer printing run.

In order to manufacture the unsaturated polymers used according to the invention, the dry starting polymers, which contain active hydrogen, for example in the form of OH—, SH—, COOH—, NH—, $CONH_2$— and CONH— groups, are merely dissolved in a suitable anhydrous solvent which does not react with sulfonyl-isocyanates, and the desired sulfonyl-isocyanate is added undiluted or dissolved in an inert solvent.

The following can be used as starting polymers for the manufacture of the polymers used according to the invention: partially saponified polyvinyl esters, polyvinyl acetals with unreacted vinyl alcohol units, epoxy resins with free OH groups, cellulose partial esters and ethers, polyamides and partially saponified copolymers of polyvinyl chloride and polyvinyl acetate.

Polyvinyl butyrals and polyvinyl formals, which are commercially available, are particularly suitable for the manufacture of the unsaturated polymers. The polymeric compounds with active hydrogen—with the exception of the polyamides—are dissolved, for example, in an 8-fold to 10-fold amount of anhydrous dioxane, optionally mixed with acetone. To this are added, for example in the same solvent in a dilution of 1:5, at 40° C., 1.25 to 1.5 moles of unsaturated sulfonyl-isocyanate relative to 1 g.-atom of active hydrogen and the mixture is stirred for a further 4 hours at 40° C. Polyamides can be reacted analogously with the unsaturated sulfonyl-isocyanate in chloroform or phosphoric acid tris-dimethylamide. A slight rise in the temperature by 5–8° C. (exothermic reaction) is dealt with by keeping the temperature of the water bath constant.

After completion of the reaction, the clear solution can be slowly added dropwise to a 10-fold amount of water at room temperature in order to separate out the reaction product; the reaction product hereupon precipitates as a colorless, amorphous but easily filterable mass. It is advisable to suspend it in water for a second time, filter it off and dry it.

One advantage of the invention is that the light-sensitive polymers used can be manufactured more simply than those hitherto known for the same purpose. However, the separation of the reaction product also can be dispensed with and the solution obtained in the reaction can be employed directly, after addition of photoinitiators and optionally of further additives, such as monomers, inhibitors, dye-stuffs or pigments, for coating the desired support material, since no interfering by-products are produced in the reaction.

It is advantageous if the unsaturated polymer used according to the invention gives a clear solution in aqueous alkali, for example a 5 percent by weight solution in 2 percent aqueous ammonia. However, particularly in the case of those layers as are customary for the manufacture of planographic printing plates (thickness $<10\mu$) it suffices if the polymer is softened or swollen by alkali. The aqueous-alkaline developer optionally can also contain added organic solvents such as acetone, aliphatic alcohols, for example methanol, ethanol, isopropyl alcohol or cyclohexanol, or aromatic alcohols such as benzyl alcohol, phenyl-ethanol and ethylene glycol-phenyl ether, to an extent of the order of 5–15 percent by weight.

To manufacture a light-sensitive copying composition, the cross-linkable polymers above described are dissolved, depending on the desired layer thickness to be applied, in a 10-fold to 30-fold amount of solvents such as dioxane, glycol monomethyl ether, or glycol monoethyl ether, ethylene glycol ethyl ether-acetate or dimethyl formamide.

In addition to the unsaturated polymers, photoinitiators and optionally photopolymerizable monomers, further additives also can be incorporated into the copying compositions according to the invention, for example: inhibitors to prevent thermal polymerization of the compositions, hydrogen donors, substances which modify the sensitometric properties of such layers, dyestuffs, colored and non-colored pigments, color-forming agents, indicators, plasticizers and the like.

These constituents appropriately should be so chosen that they absorb as little as possible in the actinic range which is important for the iniation process.

A variety of substances can be used as photoinitiators in the copying composition according to the invention. Examples are benzoin, benzoin-ethers, polynuclear quinones, for example 2-ethylanthraquinone, acridine derivatives, for example 9-phenyl-acridine, 9-p-methoxyphenyl-acridine, 9-acetylamino-acridine, and benz(a)acridine; phenazine derivatives, for example 9,10-dimethyl-benz(a)phenazine, 9-methyl-benz(a)phenazine, and 10-methoxy-benz(a)phenazine; quinoxaline derivatives, for example 6,4',4''-trimethoxy-2,3-diphenylquinoxaline and 4',4''-dimethoxy-2,3-diphenyl-5-azaquinoxaline; quinazoline derivatives and the like.

Suitable monomers are, for example, commercially available acrylic and methacrylic acid esters and also diglyceroldiacrylate, guaiacol-glycerol-ether-diacrylate, neopentyl-glycol-diacrylate, 2,2 - dimethylol-butanol-(3)-diacrylate and acrylates or methacrylates of polyesters containing hydroxyl groups. Such monomers and further monomers which are suitable for use in the copying compositions according to the invention are described, for example, in U.S. Pat. Nos. 2,760,863 and 3,060,023.

Examples of inhibitors which can be used are p-methoxyphenol, 2,6-di-tert.-butyl-p-cresol, nitrobenzene and acids such as p-toluene sulphonic acid, benzoic acid or vinylphosphonic acid.

The solutions, which if necessary are freed from any gel constituents by means of a pressure filter, are applied in the usual manner by centrifugal coating, casting or machine coating, for example "kiss-coat" application, or by a counter-rotating pair of dip and nip rollers onto the desired support, for example onto a mechanically brushed or electrolytically roughened or anodized aluminum foil of 0.08–0.5 mm. thickness.

To manufacture thick layers of up to $250\mu$ the copying composition according to the invention can be kneaded without solvents, for example in a triple roll mill, and be pressed hydraulically onto the support at 30,000 to 50,000 kg. for 1 minute at 90° C.

It is however possible to cast solutions of 20 to 40 percent solids content once or repeatedly and to allow the resulting individual coatings to evaporate slowly. By this means, for example, layers of up to $150\mu$ each and above are obtained, which are suitable, for example, for letterset printing.

Suitable supports for the copying materials manufactured with a copying composition according to the invention are, for example, aluminum, steel, zinc, copper and plastic films, for example of polyethylene terephthalate or cellulose acetate, and also screen-printing supports, such as "Perlon" gauzes. In many cases it is advantageous to subject the surface of the support to a chemical or mechanical pre-treatment, the aim of which is to achieve correct adhesion of the layer or to reduce the reflectivity of the support in the actinic range of the copying layer (anti-halation).

The copying composition according to the invention, or the copying material obtained therewith, can be used, for example, for the photomechanical manufacture of printing plates for relief printing, planographic printing, intaglio printing and screen printing, or relief copies, for example for the manufacture of texts in braille, of individual copies, tanned images, pigment images and the like. The compositions can furthermore be used for the photomechanical production of etch resists, for example for the production of nameplates and of printed circuits, and for chemical milling. The copying compositions according to the invention are of particular importance as copying layers for the photomechanical manufacture of planographic printing plates and of etch resists, especially as presensitized materials.

The processing of the copying materials according to the invention is in general carried out as follows:

Exposure

Since the exposed surfaces in the copying layers become insoluble, negative originals are used in order to produce positive copies, for example printing plates. To assess the copy from a plate, a step wedge of Messrs. UGRA, Saint Gall, Switzerland, is advantageously used, that is to say a transparent original which combines continuous tone, half-tone and line areas in a minimum surface.

A good assessment regarding the wear of the layer in the course of the printing run, and a comparison of the sensitivity of light of various copying layers with one another, is made possible by the 21-step continuous tone grey wedge of Eastman Kodak Company. For example, copying layers according to the invention, of up to 5$\mu$ thickness, are exposed image-wise under a "Kodak" wedge using the following exposure arrangements:

(a) Xenon point light source COP XP 5,000 of Messrs. Staub GmbH, Neu Isenburg, copying frame with glass plate, distance between frame and lamp 80 cm. (Xenokop).

(b) Tube exposure instrument, containing 13 fluorescent tubes of type Philips TL–AK–40 W/05 arranged over an area of 60 x 60 cm., distance of lamp 7–8 cm., covering film of polyvinyl chloride of Messrs. Moll, Solingen.

Depending on the nature of the instrument used, of the selected photoinitiator and of the layer thickness, the exposure times are between 2 and 6 minutes if, after development of the "Kodak" wedge, 4 to 5 full and 2 to 3 weakened grey steps are to be obtained.

Development

The exposed copying layers are developed with aqueous-alkaline solutions of pH 7.5–9.5, for example with 2–5 percent strength trisodium phosphate solutions in distilled water. Optionally, 5–8 percent of an organic solvent, such as methanol, ethanol, acetone, benzyl alcohol, isopropyl alcohol or cyclohexanol, can be added for the development of layers which contain unsaturated polymers based on epoxy resins or polyamides.

Appropriately, the developer is first poured over the copying layers, and after 10 seconds the latter are freed from the parts of the layer which have not been hardened, by wiping over with a swab or sponge.

The time for development and for the removal of the unexposed areas can be 15 seconds to 1 minute depending on the choice of the alkali-soluble polymers used according to the invention. After rinsing with water, the exposed areas are inked with a greasy ink, for example Protective Ink RC 42 sold by Kalle AG, Wiesbaden-Biebrich, and protected for storage by means of, example, AGUM-O of Messrs. Hans Eggen, Hannover.

Ready-to-print images of good adhesion to the support and high resistance to the developer are thus obtained.

The following examples further illustrate the invention. The parts are by weight unless otherwise stated; the percentages are by weight, and the relation between part by weight and part by volume is the same as that between the gram and the milliliter; "®" means Registered Trademark.

EXAMPLE 1

11.7 parts of polyvinyl butyral containing 77 percent of vinyl butyral units, 2 percent of vinyl acetate units and 21 percent of vinyl alcohol units and having an approximate average molecular weight of 55,000 are dissolved over the course of 1 hour in 100 parts of anhydrous dioxane at 40° C., in a 4-neck flask equipped with stirrer, reflux condenser, dropping funnel and thermometer. 4.8 parts of vinylsulfonyl isocyanate (VSI) in 20 parts of dioxane are added dropwise at the same temperature over the course of 15–20 minutes, during which a slight rise in temperature can be observed.

The reaction is allowed to take place for a further 4 hours at 40° C. while stirring. After cooling to room temperature, the clear solution is sprayed into 2,000 parts by volume of water, appropriately using a nozzle. The colorless, fibrous precipitate is filtered off, again suspended in 1000 parts of volume of water, filtered off and dried to constant weight. The product contains 2.8 percent of N and 6.2 percent of S and has a reduced specific viscosity ($\eta_{red}$/c. hereinafter abbreviated RSV) of 0.32 dl./g. in a 1 percent solution in dioxane at 25° C.

0.375 part of the resulting reaction product, 0.012 part of Michler's ketone and 0.004 part of p-methoxyphenol (inhibitor) are dissolved in 10 parts of dioxane and the solution is freed from any gel constituents by filtration and is subsequently applied by centrifugal coating onto electrolytically roughened aluminum (Rotablatt of Rotaprint AG, Berlin), to give a dry thickness of about 4 g./m.$^2$. After 1 minute's drying at 100° C., the copying material thus produced is exposed image-wise for 3 minutes using the light source indicated above under (a) at a distance of 105 cm.

The exposed plate is dipped for 15 seconds into a 2 percent aqueous trisodium phosphate solution, the unexposed areas are removed in a further 15 seconds by wiping over with a swab impregnated with the same solution, and a colorless, positive image of the negative original is obtained. The oleophilic areas are inked with greasy printing ink in the presence of dilute phosphoric acid. The printing plate is rendered storage-stable by means of preserving agents, that is to say the hydrophilic nature of the non-image areas is preserved.

EXAMPLE 2

10.1 parts of epoxy resin of molecular weight 3,800 and containing 15.5 mole percent of OH ("Epikote" ® 1009) are reacted with 5.9 parts of VSI as in Example 1. The polymer, which contains 2.5 percent of nitrogen and 5.7 percent of sulfur and is soluble in 2 percent ammonia, has an RSV value of 0.14 (1 percent solution in dioxane at 25° C.).

0.36 part of the reaction product, 0.018 part of benzanthrone and 0.002 part of p-methoxyphenol are dissolved in 12 parts of dioxane and applied by casting onto mechanically roughened aluminum to give a layer thickness of 4 g./m.$^2$. After drying by means of a hot air blower, the layer is exposed for 2 minutes under a negative screen original, using the exposure arrangement indicated above under (a). Thereafter, the plate is developed, that is to say freed from the unexposed areas, in about 30 seconds by means of 1 percent trisodium phosphate solution to which 5–10 percent of acetone has been added, and is converted into a positive printing plate which is inked with greasy ink (Protective Ink RC 42).

EXAMPLE 3

0.5 part of the reaction product of a polyvinyl butyral of molecular weight about 32,000, containing 77 percent of vinyl butyral units, 2 percent of vinyl acetate units and 21 percent of vinyl alcohol units, and VSI, 0.5 part of trimethylolpropane triacrylate and 0.017 part of Michler's ketone are dissolved in 13 parts of ethylene glycol monomethyl ether and the solution is applied by means of a "kiss-coat" applicator—wherein the plate is coated by surface contact with the coating solution—onto sandblasted and anodized aluminum and dried. The photopolymer layer is subsequently exposed under a negative screen original (60's screen) for 3 minutes, using the light source indicated above under (a) at a distance of 105 cm. After the exposure, the image areas which have not been cross-linked are removed over the course of 1 minute with a 1 percent trisodium phosphate solution. The printing plate is inked with greasy ink and preserved with AGUM-O of Messrs. Hans Eggen, Hannover. 60,000 perfect prints were obtained on a printing machine of the A. B. Dick Company.

EXAMPLE 4

12 parts of the polyvinyl butyral employed in Example 3 and 4.6 parts of propenylsulfonyl-isocyanate are reacted in absolute dioxane as in Example 1.

0.375 part of the reaction product, which has an RSV value of 0.27 (1 percent solution in ethylene glycol methyl ether acetate at 25° C.), 0.019 part of 2-ethyl-anthraquinone and 0.004 part of 2,6-di-tert.-butyl-p-cresol are dissolved in 10 parts of ethylene glycol methyl ether acetate and the solution is cast to a thickness of 3 g./m.$^2$ on electrolytically roughened aluminum (Rotoblatt of Rotaprint AG, Berlin) and dried. After the layer has been exposed image-wise for 10 minutes under the light source indicated above under (a) at a distance of 105 cm., the unexposed areas can be washed off in 30 seconds with a 2 percent trisodium phosphate solution. After inking with a greasy ink (Protective INK RC 42) in the presence of dilute phosphoric acid, a positive image of the original becomes visible.

EXAMPLE 5

10 parts of ethylcellulose of viscosity 100 cps. (5% by weight in toluene/ethanol, 80:20) at 25° C. and a degree of etherification of 2.2–2.6 for three possible ethoxy groups, are reacted with 4.5 parts of VSI as in Example 1. (Analysis: N 2.9%, S 7.2%.)

2 parts of the reaction product which is soluble in dilute ammonia, 0.05 part of 2-ethyl-anthraquinone and 0.005 part of di-tert.-butyl-p-cresol are dissolved in 12 parts of ethylene glycol monomethyl ether and the solution is cast onto an electrolytically roughened aluminum surface. The layer is allowed to dry for 24 hours in air and the plate is then placed for 3 minutes in a drying cabinet at 100° C. in order to remove any remnants of solvent. The layer thickness is 150$\mu$.

Thereafter, the light-sensitive layer is exposed for 6 minutes under a negative original with the light source indicated above under (b) at a distance of 7–8 cm.

The exposed plate is dipped into acetone for 2 minutes and the unexposed image areas are removed with a paint brush or a soft brush in the bath liquid. After drying, a colorless positive relief copy of the original is obtained.

It is also possible to dip the exposed plate for 5 minutes into alkaline solutions, for example 3 percent ammonia or 5 perecnt trisodium phosphate solution, and then to remove the swollen unexposed image areas with a paint brush.

EXAMPLE 6

20 parts of polyamide (Ultramid lc of BASF, Ludwigshafen, Germany) are swollen for 12 hours in 200 parts of phosphoric acid tris-dimethylamide and are subsequently dissolved over the course of 4 hours at 50° C., while stirring. A mixture of 50 parts of solvent and 18.8 parts of VSI is added dropwise to the clear solution over the course of 30 minutes at 40° C., and the mixture is stirred for a further 4 hours at the same temperature. The reaction product is precipitated from the cold solution by spraying into 6,000 parts by volume of water with the addition of 0.2 part of toluhydroquinone and is filtered, rinsed with water and dried in a circulating air drying cabinet at 30° C. The product contains 10.5 percent of nitrogen and 5.6 percent of sulfur, is superficially dissolved by dilute ammonia solution, and is soluble in 1 N NaOH.

4 parts of the reaction product obtained, 0.08 part of 2-ethyl-anthraquinone and 0.008 part of di-tert.-butyl-p-cresol are dissolved in 24 parts of isopropyl alcohol and 16 parts of water and the solution is cast onto electrolytically roughened aluminum as in Example 3 and is dried at room temperature.

Thereafter, the photopolymer layer is exposed for 15 minutes under a negative original with the light source used in Example 5. The plate is dipped for 2 minutes into a developer bath of 80 parts of 2 percent trisodium phosphate solution and 20 parts of isopropyl alcohol and is subsequently rubbed for a further 3 minutes in the bath liquid with a soft brush, as a result of which the unexposed image areas can be removed cleanly. A positive relief printing plate of 140$\mu$ relief depth is obtained, which can be employed for "letterset printing."

EXAMPLE 7

2.0 parts of the reaction product of polyvinyl butyral, having a molecular weight of about 75,000 and containing 78 percent of vinyl butyral units, 1 percent of vinyl acetate units and 21 percent of vinyl alcohol units and VSI (N 3.8%, S 8.3%), 2.0 parts of trimethylolpropane triacrylate, 0.2 part of 2-ethyl-anthraquinone and 0.01 part of di-tert.-butyl-p-cresol are dissolved in 15 parts of ethylene glycol methyl ether acetate and an electrolytically roughened aluminum plate is coated with the solution as in Example 5 by manual casting, and is dried. The layer thickness is 120$\mu$.

Thereafter, the photopolymer layer is exposed for 4 minutes under a negative original using the light source employed in Example 5. The exposed plate is developed for 4 minutes in a bath which is agitated by rocking and is filled with a 2 percent trisodium phosphate solution and is sprayed down with the same solution, and remnants of the unexposed image areas which may not have been dissolved off are removed with a soft paint brush.

After drying, a sharp-edged relief printing plate is obtained, which can be used for "letterset printing."

EXAMPLE 8

11.36 parts of polyvinyl butyral of approximate molecular weight 30,000, containing 71 percent of vinyl butyral units, 2 percent of vinyl acetate units and 27 percent of vinyl alcohol units, and 5.5 parts of cyclohexenylsulfonyl-isocyanate are reacted in 200 parts of absolute dioxane as described in Example 1.

0.375 part of the reaction product obtained (N 2.0 percent, S 4.4 percent, RSV-value 0.29 in a 1 percent solution in dimethylformamide at 25° C.), 0.04 part of 2-ethyl-anthraquinone and 0.004 part of di-tert.-butyl-p-cresol are dissolved in 12 parts of ethylene glycol monomethyl ether. The solution is applied to sand-blasted aluminum and dried to give a coating of 3 g./m.$^2$.

The photopolymer layer is subsequently exposed for 5 minutes under a negative original with the light source used in Example 5 and the unexposed areas are removed over the course of 1 minute with an aqueous-alkaline developer (Developer EN 11 sold by Kalle AG, Wiesbaden-Biebrich). The oleophilic areas are inked with a greasy printing ink in the presence of dilute phosphoric acid, and a positive printing plate is obtained.

It will be obvious to those skilled in the art that many modifications may be made within the scope of the present invention without departing from the spirit thereof, and the invention includes all such modifications.

What is claimed is:

1. A light-sensitive copying composition which comprises at least one light-sensitive unsaturated polymeric substance which is soluble, or at least swellable, in aqueous alkali, and at least one photoinitiator, the polymeric substance being a reaction product of a polymeric substance containing units with active hydrogen atoms, with at least one sulfonyl-isocyanate of the general formula $$R—SO_2—NCO$$

wherein R is selected from the group consisting of an aliphatic or cycloaliphatic group with at least one olefinic double bond.

2. A composition as claimed in claim 1 in which R is selected from the group consisting of a vinyl, propenyl or cyclohexenyl-(1) group.

3. A composition as claimed in claim 1 in which R is a a vinyl group.

4. A composition as claimed in claim 1 in which in the polymeric substance containing units with active hydrogen atoms, the latter are present in the form of aliphatic hydroxy groups.

5. A composition as claimed in claim 1 in which in the polymeric substance containing units with active hydrogen atoms, the latter are present in the form of vinyl alcohol units.

6. A composition as claimed in claim 1 in which the polymeric substance containing units with active hydrogen atoms is a polyamide.

7. A composition as claimed in claim 1 in which the polymeric substance containing units with active hydrogen atoms is a polyvinyl formal containing free vinyl alcohol units.

8. A composition as claimed in claim 1 in which the light-sensitive unsaturated polymeric substance is a reaction product of a polyvinyl butyral containing free vinyl alcohol units with vinylsulfonyl isocyanate.

9. A composition according to claim 1 in the form of a solid layer on a support.

References Cited

UNITED STATES PATENTS 3,147,116 9/1964 Roth ---------------- 96—115

RONALD H. SMITH, Primary Examiner

U.S. Cl. X.R.

96—33, 115 P; 204—159.14, 159.19